(12) United States Patent
Li et al.

(10) Patent No.: US 8,643,717 B2
(45) Date of Patent: Feb. 4, 2014

(54) SYSTEM AND METHOD FOR MEASURING IRREGULAR OBJECTS WITH A SINGLE CAMERA

(75) Inventors: Jingquan Li, Auburn, NY (US); William H. Havens, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 1153 days.

(21) Appl. No.: 12/397,800

(22) Filed: Mar. 4, 2009

(65) Prior Publication Data
US 2010/0225757 A1  Sep. 9, 2010

(51) Int. Cl.
*H04N 7/18* (2006.01)

(52) U.S. Cl.
USPC ............................ 348/128; 356/625; 382/286

(58) Field of Classification Search
USPC .......................................... 348/128; 382/286
See application file for complete search history.

(56) References Cited

U.S. PATENT DOCUMENTS

| | | |
|---|---|---|
| 367,176 A | 12/1899 | Barker |
| 3,947,816 A | 3/1976 | Rabedeau |
| 4,044,283 A | 8/1977 | Allison |
| 4,063,287 A | 12/1977 | VAN Rosmalen |
| 4,333,006 A | 6/1982 | Gorin et al. |
| 4,387,297 A | 6/1983 | Swartz et al. |
| 4,580,894 A | 4/1986 | Wojcik |
| 4,632,501 A | 12/1986 | Glynn |
| 4,717,241 A | 1/1988 | Aagano |
| 4,730,190 A | 3/1988 | Win et al. |
| 4,747,689 A | 5/1988 | Aldred et al. |
| 4,904,034 A | 2/1990 | Narayan et al. |
| 4,958,894 A | 9/1990 | Khowles |
| 5,013,927 A * | 5/1991 | Tsikos et al. ............. 250/559.08 |
| 5,046,843 A | 9/1991 | Keren et al. |
| 5,076,690 A | 12/1991 | deVos et al. |
| 5,080,456 A | 1/1992 | Katz et al. |

(Continued)

FOREIGN PATENT DOCUMENTS

EP    0851207 A1    7/1998

OTHER PUBLICATIONS

Schirripa Spagnolo, Giuseppe (Dipto. di Ingegneria Elettronica); Majo, Raffaele; Ambrosini, Dario; Paoletti, Domenica, Unwrapping Weighted Algorithm in Fringe Projection 3-D Profilometry Source: Proceedings of SPIE—The International Society for Optical Engineering, v 5202, 2003, p. 237-244.

(Continued)

*Primary Examiner* — Duyen Doan
(74) *Attorney, Agent, or Firm* — Additon, Higgins, Pendleton & Ashe, P.A.

(57) ABSTRACT

An optical system for measuring an irregularly shaped object includes a dimensioning station having a base, a first wall extending from the base, and a second wall extending from the base. A collimated light is passed from each of first and second collimated light sources arranged generally parallel to the base, illuminating the first and second walls and defining first and second shadows, respectively. A camera is arranged to obtain image data representing each of the first and second shadows. The system is configured to collect the image data for determining at least one dimension of an object from each of the first and second shadows. Each of the first and second collimated light sources may be a light with a collimating lens arranged between the light and the respective wall. The light source may be an LED and the collimating lens may be a collimating Fresnel lens.

28 Claims, 6 Drawing Sheets

(56) References Cited

U.S. PATENT DOCUMENTS

| | | |
|---|---|---|
| 5,168,149 A | 12/1992 | Dvorkis et al. |
| 5,193,120 A * | 3/1993 | Gamache et al. ............. 382/286 |
| 5,220,536 A | 6/1993 | Stringer et al. |
| 5,224,088 A | 6/1993 | Atiya |
| 5,280,165 A | 1/1994 | Dvorkis et al. |
| 5,329,103 A | 7/1994 | Rando |
| 5,331,118 A | 7/1994 | Jensen |
| 5,373,148 A | 12/1994 | Dvorkis et al. |
| 5,412,198 A | 5/1995 | Dvorkis |
| 5,495,097 A | 2/1996 | Katz et al. |
| 5,543,610 A | 8/1996 | Bard et al. |
| 5,547,034 A | 8/1996 | Wurz et al. |
| 5,555,090 A | 9/1996 | Schmutz |
| 5,581,067 A | 12/1996 | Grosfeld et al. |
| 5,590,060 A | 12/1996 | Granville et al. |
| 5,600,119 A | 2/1997 | Dvorkis et al. |
| 5,633,487 A | 5/1997 | Schmutz et al. |
| 5,646,724 A | 7/1997 | Hershline |
| 5,656,799 A | 8/1997 | Ramsden et al. |
| 5,661,561 A | 8/1997 | Wurz et al. |
| 5,689,092 A | 11/1997 | Wurz et al. |
| 5,699,161 A | 12/1997 | Woodworth |
| 5,734,476 A | 3/1998 | Dlugos |
| 5,737,438 A | 4/1998 | Zlotnick et al. |
| 5,814,802 A | 9/1998 | Hecht et al. |
| 5,831,220 A | 11/1998 | Ramsden et al. |
| 5,831,737 A | 11/1998 | Stringer et al. |
| 5,850,370 A | 12/1998 | Stringer et al. |
| 5,869,827 A | 2/1999 | Rando |
| 5,870,220 A | 2/1999 | Migdal et al. |
| 5,872,631 A * | 2/1999 | Slettemoen .................. 356/625 |
| 5,889,550 A | 3/1999 | Reynolds |
| 5,900,611 A | 5/1999 | Hecht |
| 5,923,428 A | 7/1999 | Woodworth |
| 5,969,823 A | 10/1999 | Wurz et al. |
| 5,978,512 A | 11/1999 | Kim |
| 5,979,760 A | 11/1999 | Freyman et al. |
| 5,984,186 A | 11/1999 | Tafoya |
| 5,991,041 A | 11/1999 | Woodworth |
| 5,995,226 A | 11/1999 | Abe et al. |
| 6,049,386 A | 4/2000 | Stringer et al. |
| 6,053,409 A | 4/2000 | Brobst et al. |
| 6,064,629 A | 5/2000 | Stringer et al. |
| 6,069,696 A | 5/2000 | McQueen et al. |
| 6,123,264 A | 9/2000 | Li et al. |
| 6,137,577 A | 10/2000 | Woodworth |
| 6,147,358 A | 11/2000 | Hecht |
| 6,177,999 B1 | 1/2001 | Wurz et al. |
| 6,257,490 B1 | 7/2001 | Tafoya |
| 6,296,187 B1 | 10/2001 | Shearer |
| 6,373,579 B1 | 4/2002 | Ober et al. |
| 6,455,835 B1 * | 9/2002 | Bernardini et al. ........ 250/208.1 |
| 6,457,642 B1 | 10/2002 | Good et al. |
| 6,504,615 B1 | 1/2003 | Abe et al. |
| 6,577,404 B2 * | 6/2003 | Max et al. .................... 356/601 |
| 6,641,042 B1 | 11/2003 | Pierenkemper et al. |
| 6,674,904 B1 | 1/2004 | McQueen |
| 6,700,671 B2 * | 3/2004 | Akishiba ...................... 356/638 |
| 6,705,526 B1 | 3/2004 | Zhu et al. |
| 6,798,528 B1 * | 9/2004 | Hartman ...................... 356/625 |
| 7,104,453 B1 | 9/2006 | Zhu et al. |
| 7,209,586 B2 | 4/2007 | Massen et al. |
| 7,376,284 B2 | 5/2008 | Tao et al. |
| 7,400,413 B2 | 7/2008 | Jeon et al. |
| 7,463,348 B2 | 12/2008 | Chung |
| 7,474,389 B2 | 1/2009 | Greenberg et al. |
| 7,726,575 B2 | 6/2010 | Wang et al. |
| 7,843,574 B2 * | 11/2010 | Schmitt et al. ................ 356/611 |
| 7,884,949 B2 * | 2/2011 | Koh et al. ..................... 356/602 |
| 2001/0027995 A1 | 10/2001 | Patel et al. |
| 2002/0179708 A1 | 12/2002 | Zhu et al. |
| 2003/0038179 A1 | 2/2003 | Tsikos et al. |
| 2003/0053513 A1 | 3/2003 | Vatan et al. |
| 2003/0080192 A1 | 5/2003 | Tsikos et al. |
| 2003/0085281 A1 | 5/2003 | Knowles et al. |
| 2003/0127518 A1 | 7/2003 | Park et al. |
| 2004/0114153 A1 * | 6/2004 | Andersen et al. ............. 356/606 |
| 2006/0086794 A1 | 4/2006 | Knowles et al. |
| 2007/0012777 A1 | 1/2007 | Tsikos et al. |
| 2007/0029390 A1 | 2/2007 | Tsikos et al. |
| 2007/0165243 A1 | 7/2007 | Kang et al. |
| 2007/0175999 A1 | 8/2007 | Tsikos et al. |
| 2007/0181685 A1 | 8/2007 | Zhu et al. |

OTHER PUBLICATIONS

Mishra, D.K.; Chandwani, K.; Jain, A., CCD Camera Based Automatic Measurement of Area and Volume of 3-D Objects, IEEE International Workshop on Emerging Technologies and Factory Automation, 1992. vol. 11, Issue 14, Aug. 1992, pp. 172-177.

Williamson, Mark, Using Multiple Cameras for 3D Profiling Irregular Objects, Firstsight Vision Limited, Issue 1, Feb. 19, 2003, 4 pgs.

* cited by examiner

SYSTEM AND METHOD FOR MEASURING IRREGULAR OBJECTS WITH A SINGLE CAMERA

BACKGROUND OF THE INVENTION

The transportation of objects, such as packages, luggage, boxes and other goods from one place to another by a common carrier, or the like, is an expensive operation. As can be easily understood, the object's dimensions and/or volume may be as important, or more so, than the weight of the object. For example, many modes of transportation have a weight limit that will never be met or exceeded if objects of relatively low density are being transported. In other words, the object's dimensions and/or volume may be more of a limiting factor in terms of the number of transported items, than weight. For many years, however, the weight of an object has been nearly the sole means for assessing the cost of shipping an object. Given the high cost of fuel and the limited amount of space for objects, carriers now want to be able to more accurately include the dimensions and/or volume into the amount charged for such a shipment.

Obtaining an object's dimensions and/or volume is not typically fast, easy, or without error. This fact is a primary reason why many shippers have failed to incorporate the object's dimensions and/or volume into any fee calculations. For example, when the object is a simple box shape, a person may use a tape measure to obtain dimensions for the box's height, width and depth. The usefulness of the tape measure or other physical measuring device is not typically an accurate means for measuring objects having a complex shape such as a pyramid, any shape with rounded corners, a shape with projections occurring along a side surfaces, etc. Of course, in a laboratory setting, a technician could have an object's volume measured by submerging the object into a liquid and measuring the volume of the displaced liquid. This method would, of course, be incompatible with most objects sent via a common carrier on a daily basis, and would not provide the objects linear dimensions, which may be more important than the object's volume.

As a result of these challenges, carriers have taken an approach of roughly approximating an overall box size or envelope that encompasses the object having a complex shape. Other carriers have adopted the use of a template enclosure, which is used to determine merely whether an object is oversized (i.e., will not fit within the template). These approaches are, however, merely rough approximations.

Carriers attempting to increase profits must have a way to quickly obtain an object's dimensions and/or volume regardless of whether the object is of a complex shape. Knowing the approximate dimensions and/or volume of an object allows the carrier to more efficiently fill containers and more appropriately charge consumers for the space required by their object. Further, the process of obtaining such measurements can not add additional time to the overall process flow in such a manner that eliminates the gains achieved by the accurate measurements. In light of the foregoing, it should be easy to see that accurate and fast measurements of an object to be shipped may allow a carrier to remain profitable during times of increased energy costs, increased labor costs, and constant consumer pressure to reduce costs.

SUMMARY OF THE INVENTION

The present invention helps a carrier to obtain an object's dimensions and/or volume in a fast and efficient manner. Due to the relative speed and accuracy of the present invention, common carriers can now more easily determine accurate charges for shipping an object, and more accurately apportion the true cost of shipping a particular object.

In accordance with one embodiment of the present invention, an optical system is provided for measuring an irregularly shaped object. The system includes a dimensioning station having a base and a first wall extending from the base. The system further includes a first collimated light source. A first collimated light passes from the first collimated light source generally parallel to the base, illuminating the first wall, and defining a shadow. The system further includes a camera arranged to obtain image data representing the shadow. The system is configured to collect the image data for determining at least one dimension of an object. Preferably, the first wall extends perpendicular to the base.

In accordance with one embodiment of the present invention, the system further includes a second wall extending from the base. Preferably, the second wall extends perpendicular to the base. Preferably, the second wall extends perpendicular to the first wall.

In accordance with one embodiment of the present invention, the system further includes a second collimated light source, a second collimated light passing from a second collimated light source generally parallel to the base, illuminating the second wall, and defining a second shadow. Preferably, the second collimated light is generally perpendicular to the first collimated light.

In accordance with one embodiment of the present invention, the system further includes a third collimated light source, a third collimated light passing from the third collimated light source generally perpendicular to the base, illuminating the base, and defining a third shadow. Preferably, the third collimated light is generally perpendicular to at least one of the first collimated light and the second collimated light.

In accordance with one embodiment of the present invention, the first collimated light source is a first light and a first collimating lens arranged between the first light and the first wall. Preferably, the first collimating lens is a collimating Fresnel lens. In accordance with one embodiment, the first light is an LED. In accordance with another embodiment, the first light is a laser diode.

In accordance with one embodiment of the present invention, the second collimated light source is a second light and a second collimating lens arranged between the second light and the second wall. Preferably, the second collimating lens is a collimating Fresnel lens. In accordance with one embodiment, the second light is an LED. In accordance with another embodiment, the second light is a laser diode.

In accordance with one embodiment of the present invention, the object is resting on the base. A size of a shadow formed on one of the first wall and the second wall represents at least one of a height, width and depth of the object. A size of a shadow formed on another one of the first wall and the second wall represents at least one of a height, width and depth of the object. In accordance with one embodiment, at least one dimension of the object is greater than 4 inches. In accordance with another embodiment, at least one dimension of the object is greater than 6 inches. In accordance with another embodiment, at least one dimension of the object is greater than 12 inches.

In accordance with one embodiment of the present invention, a method is provided for measuring an irregularly shaped object. The method includes providing a dimensioning station including a base and a first wall extending from the base, illuminating the first wall with a first collimated light arranged generally parallel to the base, and placing an object to be measured on the base. The method further includes measuring a size attribute of a first shadow formed on the first wall by the first collimated light and the object to be measured. Preferably, the size attribute of the first shadow is measured using a camera arranged to have a view of the first wall. Preferably, the first collimated light is created using a light source and a collimating lens. Preferably, the collimating lens is a Fresnel lens. In accordance with one embodiment, the light source is a LED. In accordance with another embodiment, the light source is a laser diode.

In accordance with one embodiment of the present invention, the method further includes providing a second wall extending from the base, illuminating the second wall with a second collimated light arranged generally parallel to the base, and measuring a size attribute of a second shadow formed on the second wall by the second collimated light and the object to be measured. Preferably, the size attribute of the second shadow is measured using a camera arranged to have a view of the first wall and the second wall. Preferably, the second collimated light is created using a light source and a collimating lens. Preferably, the collimating lens is a Fresnel lens. In accordance with one embodiment, the light source is a LED. In accordance with another embodiment, the light source is a laser diode.

In accordance with one embodiment of the present invention, the method further includes illuminating the base with a third collimated light arranged generally perpendicular to the base, and measuring a size attribute of a third shadow formed on the base by the third collimated light and the object to be measured. Preferably, the size attribute of the third shadow is measured using a camera arranged to have a view of the first wall, the second wall and the base. Preferably, the third collimated light is created using a light source and a collimating lens. Preferably, the collimating lens is a Fresnel lens. In accordance with one embodiment, the light source is a LED. In accordance with another embodiment, the light source is a laser diode.

BRIEF DESCRIPTION OF THE DRAWINGS

For a further understanding of the nature and objects of the invention, references should be made to the following detailed description of a preferred mode of practicing the invention, read in connection with the accompanying drawings in which.

DETAILED DESCRIPTION

Figure 1:
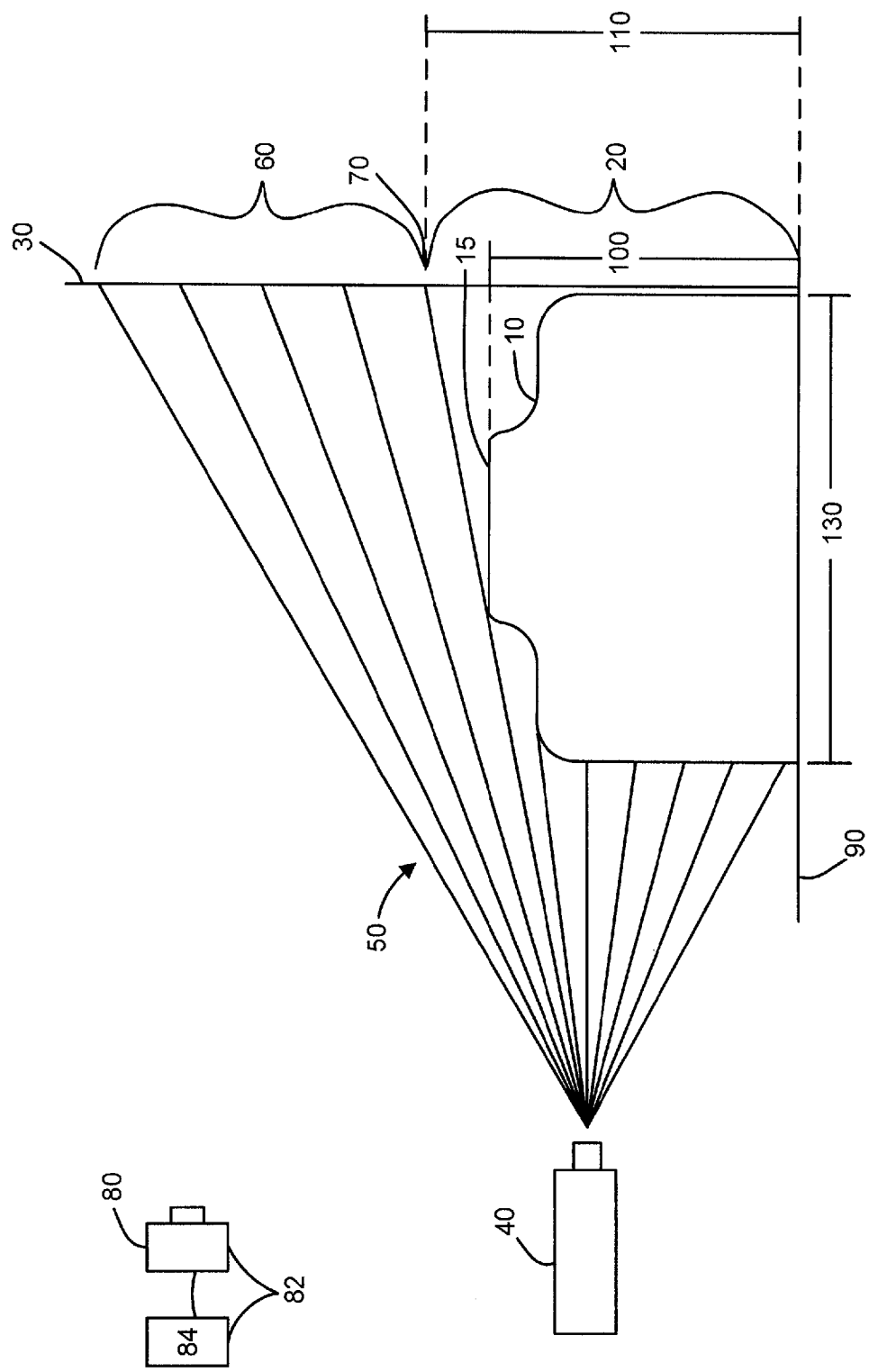
FIG. 1 is a side view representation of a dimensioning station system arranged in accordance with an embodiment of the present invention.
Figure 2:
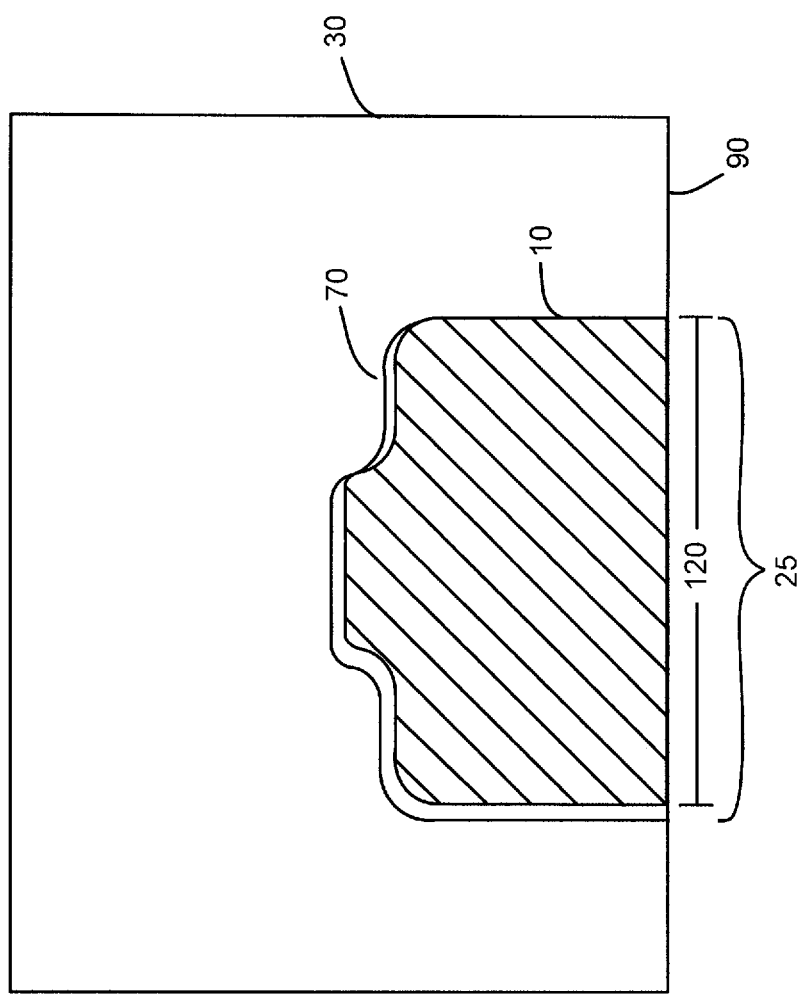
FIG. 2 is a front view representation of the dimensioning station system shown in FIG. 1.

Referring first to FIGS. 1 and 2, which represent a dimensioning station system arranged in accordance with one embodiment of the present invention, an object 10 creates a shadow area 20 (FIG. 1), 25 (FIG. 2) on a wall 30 when a light source 40 is arranged to direct a light 50 toward the wall 30. The light 50 reaches the wall 30 in a lighted area 60, while a transition area 70 is formed at the intersection between the shadow area 20 and the lighted area 60. A camera 80 can be used to determine the location of the shadow area 20 and/or the transition area 70 and thus be able to determine a height 110 of the shadow area 20 above a base 90 on which the object 10 is resting. In particular, as shown in FIG. 2, the transition area 70 is a relative profile of the object 10 such that an actual height 100 (FIG. 1) and an actual width 120 (FIG. 2) of the object 10 can be estimated. The actual process of the determining the height 110 and width 120 of the shadow area 20 and 25, respectfully, from an image will be discussed in further detail below. Of current concern, is that the transition area 70 may not closely represent the actual height 100 and actual width 120 of the object 10.

As can be seen in FIGS. 1 and 2, the nature of the light 50 passing from the light source 40 is that it will create the transition area 70 with an error relating directly to the length 130 of the object 10. In general, the larger the length 130 is in relation to the wall 30, the larger the errors will be in measuring the actual height 100 and the actual width 120 by measuring the dimensions of the transition area 70. Further, when the object 10 is irregularly shaped, as it is shown in FIG. 1, a projection 15 off of the object can cause additional problems when trying to accurately measure the dimensions of the object 10. The amount of error induced by the projection 15 relates directly to where the projection is positioned along the length 130 of the object. As can be understood from FIG. 1, if the projection were located further from the wall 30, the height 100 of the shadow 20 would be taller. Conversely, if the projection 15 were located closer to the wall 30, the height 100 of the shadow 20 would be shorter. The same is true when measuring width 120.

Figure 3:
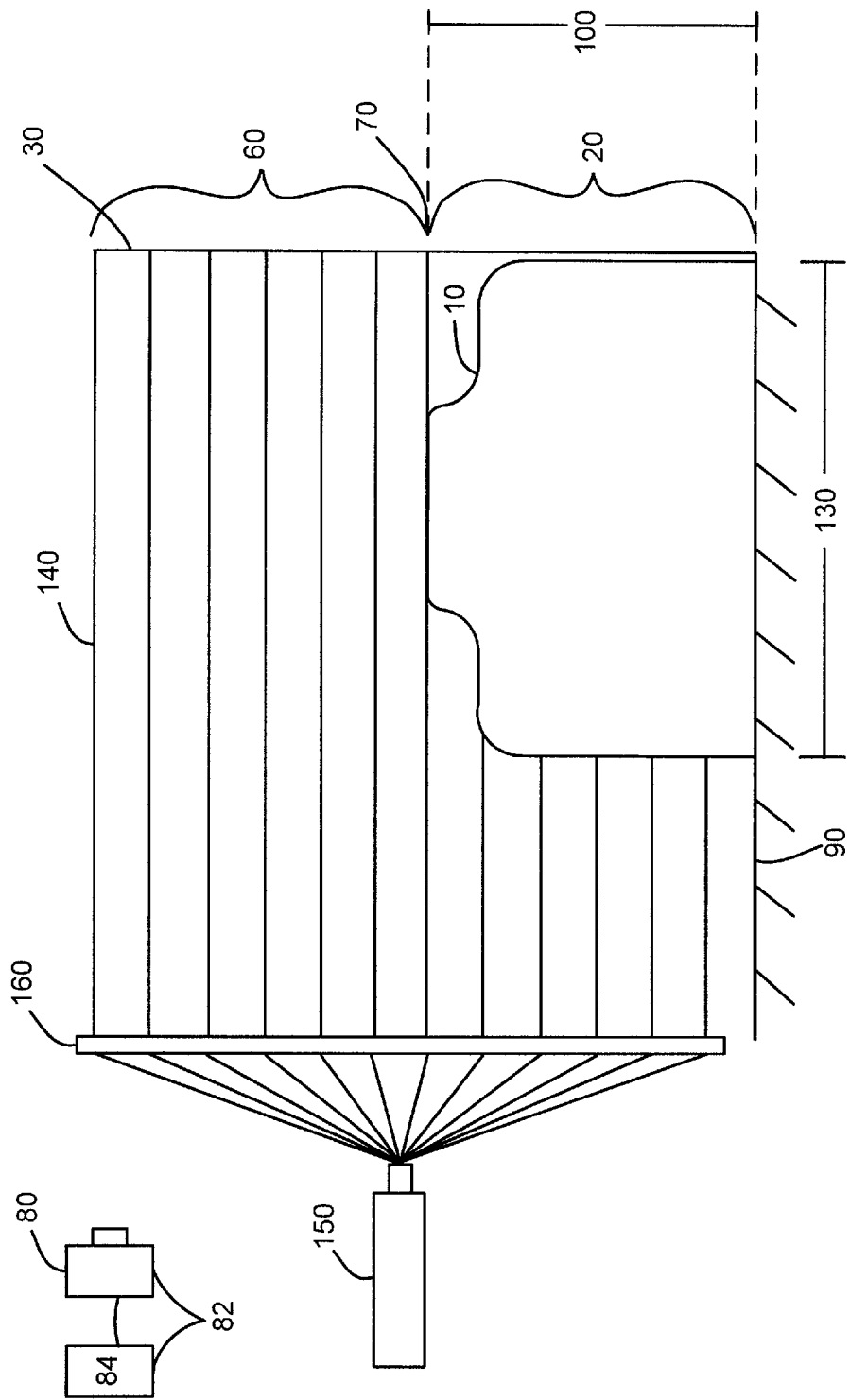
FIG. 3 is a side view representation of a dimensioning station system arranged in accordance with an embodiment of the present invention.
Figure 4:
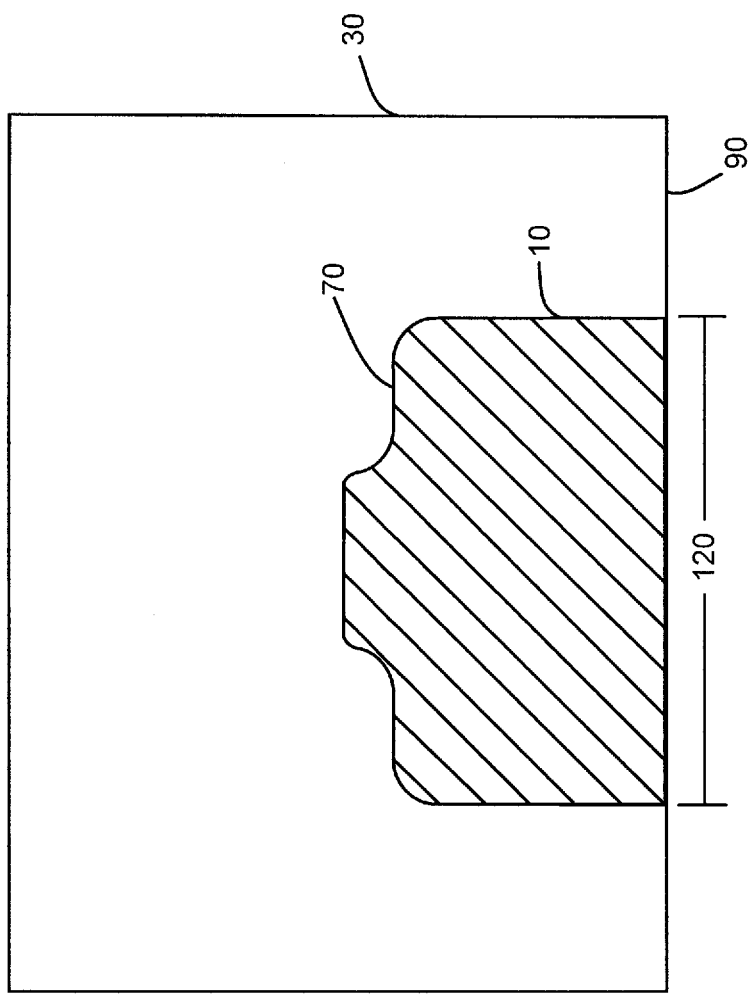
FIG. 4 is a front view representation of the dimensioning station system shown in FIG. 3.

Referring now to FIGS. 3 and 4, a collimating lens 160 is placed between the wall 30 and a light source 150 such that a collimated light 140 passes generally parallel to the base 90. The light source is located at a focal point for the collimating lens 160 to create the collimated light 140. Before furthering the discussion relating to the present embodiment, it must be understood that the term "generally" is used along with the term parallel because true collimated light is a theoretical goal, especially in a practical sense. In other words, there are many factors that nearly prohibit the possibility of perfect collimated light, which could be truly parallel to the base 90.

For example, assuming that there is a perfect collimating lens, the light source would need to be an impossibly small, point, light source. A light source having any size, albeit a small size, will create columns of light having as least some conical shape, which relates directly to size of the light source. Further, while many forms of collimating lenses, such as Fresnel lenses, mirrored lenses, etc, are quite good, these lenses are not perfect in terms of distortion added to the collimated light. In view of the forgoing, the term "generally" is defined and should be understood to include these small amounts of conical shape and distortion that are inherent to practical designs for providing collimated light.

The collimated light 140 present in the embodiment of FIGS. 3 and 4 allows for a shadow 20 and transition area 70 that more directly relate to the actual height 100 of the object 10. As shown in FIG. 4, the transition area 70 follows closely the actual height 100 (FIG. 3) and actual width 120 profile of the object 10. Further, because the collimated light 140 is generally perpendicular to the base 90, the transition area 70 will continue to closely follow the height and width profile of the object 10, regardless of the length 130 of the object 10.

Because the length 130, or other dimensions, of the object 10 no longer adversely affect the relationship between the transition area 70 and the height and width profile of the object 10, the object 10 can be of a larger size, such as over 4 inches, 6 inches, 12 inches, etc. Even though the object 10 is shown nearly against the wall 30 in the figures, it may be beneficial to place the object a greater distance away from the wall so that the shadow 20 is more easily identified separate from the object 10.

The collimated light 140 in the present embodiment is created by passing light from the light source 150, such as an LED, a laser, a laser diode, an arc lamp, an incandescent lamp, a halogen lamp, etc. placed at the focal point of the collimating lens, through the collimating lens 160. The Fresnel lens is chosen as the collimating lens 160 for this embodiment because of its small thickness and because of cost. An example of the type of Fresnel lens that may be used is the "magnifying sheet," item number 931974, which may be purchased from Staples®. It should be understood that any of the known collimating lenses (e.g. plastic lenses or mirrors) may function well in place of the collimating Fresnel lens represented in this embodiment.

Before proceeding, it should be understood that the embodiments disclosed in FIGS. 1-4 measure dimensions in a single measurement plane of the object 10. For example, dimensions along two axes, such as height and width, height and length, length and width, etc., may be measured in each measurement plane. However, it is very unlikely that two axes may be measured in the single measurement plane of the embodiment shown in FIGS. 1 and 2, because the light source 40 would need to be located at the center of the object 10, which is not the case, as represented in FIG. 2. The use of the collimated light 140 in the embodiment of FIGS. 3 and 4 makes it possible to measure dimensions along two axes in the plane of measurement, even if the light source 150 is not located at the center of the object 10.

For at least the forgoing reasons, only a profile (i.e. the transition area 70) of the height 110 and width 120 of the shadow 20 in the single measurement plane are determined in the embodiment represented in FIGS. 3 and 4. To determine a profile relative to the length 130 or other base dimensions of the object, additional light sources 40 (FIG. 1), 150 (FIGS. 3 and 5), 250 (FIG. 5), and 350 (FIG. 5) may be used. In other words, to obtain these other dimensions, additional measurement planes could be incorporated in the same manner as the first measurement plane in FIGS. 1-4.

It should also be understood that the term "base" (i.e., base 90) does not specifically define a surface perpendicular to gravity. For example, the term "base" can be interchanged with one "wall" when/if the embodiment shown in FIG. 3 is arranged 90 degrees clockwise from the arrangement currently shown. In other words, while the term "base" is used instead of a "wall" to add clarity for the reader, the "base" may be thought of as a "wall" separate from, and preferably perpendicular to, the first wall 30 (FIGS. 1-5), and/or the second wall 230 (FIG. 5).

As few as one measurement plane may be beneficial in some applications, while two or three measurement planes may be beneficial in others. Additionally, a single measurement plane system could be employed with a rotary table (not shown) to obtain dimensions from another axis by rotating the object 10 in 90 degree increments. An embodiment with more than one measurement plane is represented in FIG. 5, which is discussed below.

Figure 5:
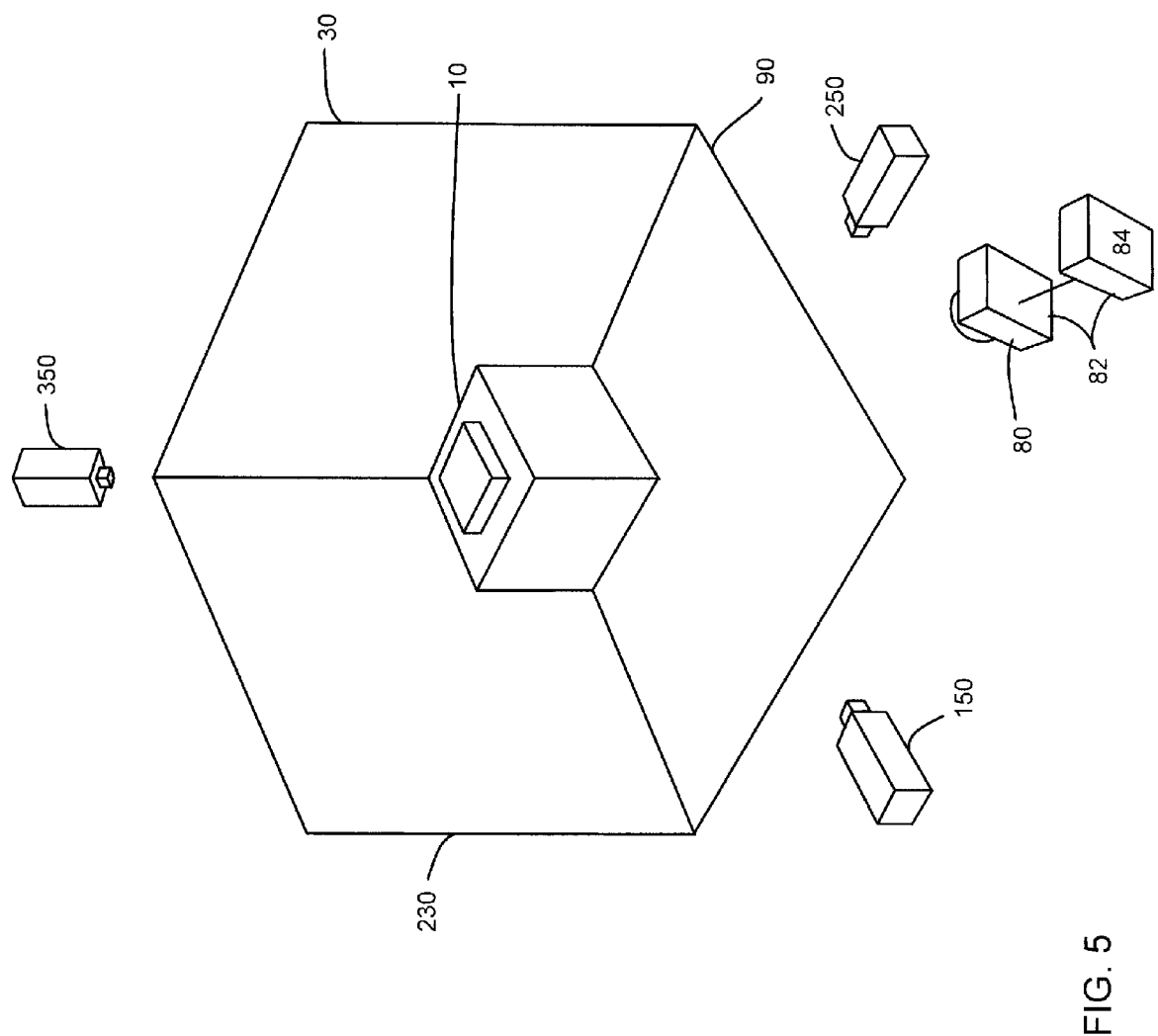
FIG. 5 is a upper perspective view of a dimensioning station system arranged in accordance with an embodiment of the present invention.

Referring now to FIG. 5, three collimating light sources, represented solely by light sources 150, 250, 350 can be used to obtain additional dimensional characteristics of the object.

Please note that corresponding collimating lenses are not represented in FIG. 5 for the sake of clarity. They would, however, be located between the light source 150, 250, 350 and respective walls/base 30, 230, 90 in the manner represented in FIG. 3. Further, while each of light sources 150 and 250 produce collimated light generally parallel for the base 90, light source 350 is to produce collimated light generally perpendicular to the base for similar reasons. It should be understood that function of each collimating light source 150, 250, 350 will be similar in form and function to the singular axis of measurement example described above in relation to FIGS. 3 and 4.

A single camera 80 can be used so long as it is arranged with a full view of the walls 30, 230 and/or the base 90. This statement should not be interpreted as to exclude additional cameras 80, because the dimensioning station shown in FIG. 5 could include additional cameras 80, as required by space constraints, clarity required, etc. It should also be understood that because there is only one camera 80 used in the present embodiment, the camera 80 can be arranged with a view of the walls 30, 230 and base 90 that will be used for dimensioning purposes. If there is no third light source 350 present, the camera may not need a view of the base 90, and so on.

Figure 6:
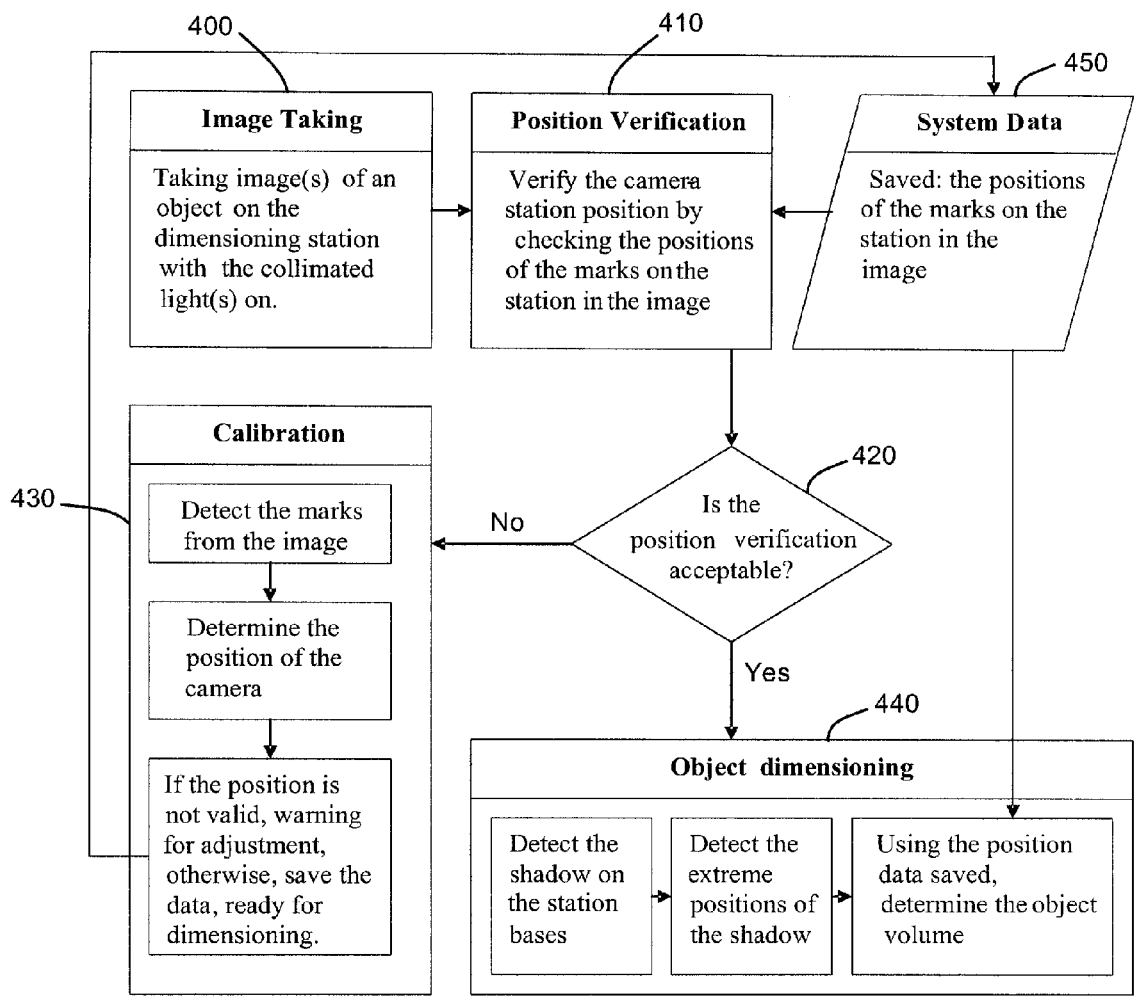
FIG. 6 is a flow chart representing a dimensioning process applicable to the dimensioning station systems shown in FIGS. 1, 3, and 5.

The flowchart depicted FIG. 6 describes a process with which the camera 80 is used to obtain the dimensions and/or volume of the object 10 placed on the base 90. The camera 80 can be provided as part of a camera assembly 82 including the camera 80, for use in collecting a processable image, and a processing unit 84, for use in processing the image. The processor unit 84 can be CPU based. First, an image is taken of the object 10 on the base of the dimensioning station in step 400. The processing unit 84 then verifies a position of the camera 80 by checking the positions of known marks (not shown) on the walls 30, 230 and/or base 90 of the dimensioning station in step 410. The identification of these known marks from the image occurs due to the known marks having a contrast in color, shade, or texture from the walls 30, 230 and the base 90 that can easily be differentiated from the background.

In step 420, the processing unit 84 places the system into a calibration sequence 430 if the position of the known marks is not verified. If the position of the known marks is verified, the processing unit 84 will proceed with a dimensioning sequence 440.

In the calibration sequence 430, the processing unit 84 detects the known marks from the image taken, determines the position of the camera 80 and saves the information in preparation for dimensioning sequence 430. If the processing unit 84 determines that the position of the camera 80 is not valid, the processing unit 84 will issue a warning that the position of the camera 80 is not valid. Once the position of the camera is determined to be acceptable, the position data relating to the positions of known marks is then saved, in step 450 for use in the dimensioning sequence 440, which can then be started.

In the dimensioning sequence 440, the processing unit 84 detects the shadow 20. More precisely, the processing unit detects an extreme edge of the shadow that has been referred to above as the transition area 70. Using the data saved in step 450, the profile of the transition area 70 on each of the relevant walls 30, 230 and/or base 90 can then be used to determine the dimensions and/or volume of the object 10. For example, an area of the shadows 20 identified on the first wall 30 and the second wall 230 could multiplied together to obtain a basic area of the object 10. When the third axis (e.g. the base 90) is utilized, selective portions of shadows from each of the walls 30, 230 and the base 90 can be used to calculate the volume, understanding that some of the transition areas 70 and the corresponding shadows 20 are duplicates among the three axes. For example, the width 120 and length 130 of the object may be identified in the third axis using the base 90.

Depending on the desired level of accuracy, these duplicate representative areas could be averaged or combined using a percentage of each, such that the value obtained from one axis is granted greater weight in an averaging process than the respective value obtained from another axis. Another option would be to determine a variety of different calculated volumes for the object 10 by using different combinations of the available dimensions in order to find one combination resulting in the smallest volume. The smallest calculated volume may be closest to the actual volume of the object 10.

Finding the smallest calculated volume, may be accomplished more easily by defining a particular method for placing the object 10 onto the dimensioning station. For example, a user could place the largest support base of the object 10 onto the base 90, and to then slide the second largest face against the first wall 30. Lastly, the user could slide the object so that the third largest face of the object 10 against the third wall. Even though this method of placing the object may result in a calculated volume that is closest to the actual volume of the object 10, it is envisaged that the object 10 will be placed randomly on the base 90, because of the amount of time and skill required for such placement.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

We claim:

1. An optical system for measuring an irregularly shaped object, the system comprising:
   a dimensioning station including a base and a first wall extending from the base;
   a first collimated light source, a first collimated light passing from the first collimated light source generally parallel to the base, illuminating the first wall, and defining a shadow, and
   a camera arranged to obtain image data representing the shadow,
   wherein the system is configured to collect the image data for determining at least one dimension of an object.

2. The optical system of claim 1, wherein the first wall extends perpendicular to the base.

3. The optical system of claim 1 further comprising a second wall extending from the base.

4. The optical system of claim 3, wherein the second wall extends perpendicular to the base.

5. The optical system of claim 4, wherein the second wall extends perpendicular to the first wall.

6. The optical system of claim 4 further comprising a second collimated light source, a second collimated light passing from a second collimated light source generally parallel to the base, illuminating the second wall, and defining a second shadow.

7. The optical system of claim 6, wherein the second collimated light is generally perpendicular to the first collimated light.

8. The optical system of claim 6 further comprising a third collimated light source, a third collimated light passing from the third collimated light source generally perpendicular to the base, illuminating the base, and defining a third shadow.

9. The optical system of claim 8, wherein the third collimated light is generally perpendicular to at least one of the first collimated light and the second collimated light.

10. The optical system of claim 1, wherein the first collimated light source is a first light and a first collimating lens arranged between the first light and the first wall.

11. The optical system of claim 10, wherein the first collimating lens is a collimating Fresnel lens.

12. The optical system of claim 10, wherein the first light is an LED.

13. The optical system of claim 6, wherein the second collimated light source is a second light and a second collimating lens arranged between the second light and the second wall.

14. The optical system of claim 13, wherein the second light is an LED.

15. The optical system of claim 4, wherein the object is resting on the base,
   wherein a size of a shadow formed on one of the first wall and second wall represents at least one of a height, width and depth of the object, and
   wherein a size of a shadow formed on another one of the first wall and the second wall represents at least one of a height, width and depth of the object.

16. The optical system of claim 15, wherein at least one dimension of the object is greater than 6 inches.

17. A method of measuring an irregularly shaped object, the method comprising:
   providing a dimensioning station including a base and a first wall extending from the base;
   illuminating the first wall with a first collimated light arranged generally parallel to the base;
   placing an object to be measured on the base; and
   measuring a size attribute of a first shadow formed on the first wall by the first collimated light and the object to be measured.

18. The method of claim 17 further comprising:
   providing a second wall extending from the base;
   illuminating the second wall with a second collimated light arranged generally parallel to the base; and
   measuring a size attribute of a second shadow formed on the second wall by the second collimated light and the object to be measured.

19. The method of claim 18 further comprising:
   illuminating the base with a third collimated light arranged generally perpendicular to the base; and
   measuring a size attribute of a third shadow formed on the base by the third collimated light and the object to be measured.

20. The method of claim 17, wherein the size attribute of the first shadow is measured using a camera arranged to have a view of the first wall.

21. The method of claim 18, wherein the size attribute of the second shadow is measured using a camera arranged to have a view of the first wall and the second wall.

22. The method of claim 19, wherein the size attribute of the third shadow is measured using a camera arranged to have a view of the first wall, the second wall and the base.

23. The method of claim 17, wherein the first collimated light is created using a light source and a collimating lens.

24. The method of claim 23, wherein the collimating lens is a Fresnel lens.

25. The method of claim 23, wherein the light source is a LED.

26. The optical system of claim 1, wherein the shadow is defined on the first wall, and wherein the camera has a view of the first wall.

27. The optical system of claim 6, wherein the shadow is defined on the first wall, wherein the second shadow is defined on the second wall, and wherein the camera has a view of the first wall at the second wall so that the camera is arranged to obtain image data representing the shadow and the second shadow.

28. The optical system of claim 8, wherein the shadow is defined as the first wall, wherein the second shadow is defined on the second wall, wherein the third shadow is defined on the base, and wherein the camera has a view of the first wall, the second wall, and the base so that the camera is arranged to obtain image data representing the shadow, the second shadow, and the third shadow.

* * * * *